(12) United States Patent
Lee et al.

(10) Patent No.: US 12,529,609 B2
(45) Date of Patent: Jan. 20, 2026

(54) ELECTRONIC DEVICE AND METHOD OF ESTIMATING CORE BODY TEMPERATURE USING THE SAME

(71) Applicant: SAMSUNG ELECTRONICS CO., LTD., Suwon-si (KR)

(72) Inventors: Ho Taik Lee, Suwon-si (KR); Sang Kyu Kim, Suwon-si (KR); Bok Soon Kwon, Suwon-si (KR); Sung Ho Kim, Suwon-si (KR); So Young Lee, Suwon-si (KR); Hong Soon Rhee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 488 days.

(21) Appl. No.: 18/085,128

(22) Filed: Dec. 20, 2022

(65) Prior Publication Data

US 2024/0011846 A1    Jan. 11, 2024

(30) Foreign Application Priority Data

Jul. 5, 2022 (KR) .................. 10-2022-0082789

(51) Int. Cl.
*G01K 13/20* (2021.01)
*G01K 7/22* (2006.01)
*G01K 7/42* (2006.01)

(52) U.S. Cl.
CPC ............. *G01K 13/20* (2021.01); *G01K 7/22* (2013.01); *G01K 7/427* (2013.01)

(58) Field of Classification Search
CPC .................................. G01K 13/20; G01K 7/22
See application file for complete search history.

(56) References Cited

U.S. PATENT DOCUMENTS

| | | |
|---|---|---|
| 7,299,090 B2 | 11/2007 | Koch |
| 8,716,629 B2 | 5/2014 | Klewer et al. |
| 9,101,271 B2 | 8/2015 | Sattler |
| 9,354,122 B2 | 5/2016 | Bieberich et al. |
| 9,699,546 B2 | 7/2017 | Qian et al. |
| 9,716,937 B2 | 7/2017 | Qian et al. |
| 10,088,373 B2 | 10/2018 | Durrer et al. |
| 10,274,383 B2 | 4/2019 | Bieberich et al. |

(Continued)

FOREIGN PATENT DOCUMENTS

| | | |
|---|---|---|
| CN | 111513684 A | 8/2020 |
| CN | 111752134 A | 10/2020 |

(Continued)

*Primary Examiner* — Stephen D Meier
*Assistant Examiner* — Leo T Hinze
(74) *Attorney, Agent, or Firm* — Sughrue Mion, PLLC

(57) ABSTRACT

An electronic device according to an embodiment of the present disclosure includes: a first temperature sensor configured to measure a first temperature of body skin; a second temperature sensor configured to measure a second temperature inside a main body; a thermal resistance structure having effective thermal resistance so that a difference between the first temperature and the second temperature is greater than or equal to a predetermined threshold value; and a processor configured to obtain skin heat flux based on the first temperature and the second temperature, and to estimate core body temperature of a user based on the first temperature and the skin heat flux.

19 Claims, 15 Drawing Sheets

(56) References Cited

U.S. PATENT DOCUMENTS

| | | |
|---|---|---|
| 10,405,755 B2 | 9/2019 | Shrubsole et al. |
| 10,668,206 B2 | 6/2020 | Newell et al. |
| 10,765,409 B2 | 9/2020 | Lafon et al. |
| 10,959,942 B2 | 3/2021 | Sandvang et al. |
| 11,071,814 B2 | 7/2021 | Newell et al. |
| 11,090,423 B2 | 8/2021 | Newell et al. |
| 11,090,424 B2 | 8/2021 | Newell et al. |
| 2007/0225614 A1 | 9/2007 | Naghavi et al. |
| 2008/0300819 A1* | 12/2008 | Koch ........................ G01K 7/42 |
| | | 374/E7.042 |
| 2016/0081629 A1 | 3/2016 | Rostalski et al. |
| 2020/0060869 A1 | 2/2020 | Telfort et al. |
| 2020/0217727 A1 | 7/2020 | Heitz et al. |
| 2021/0123819 A1 | 4/2021 | Seyama et al. |
| 2021/0186337 A1 | 6/2021 | Matsunaga et al. |
| 2021/0353842 A1 | 11/2021 | Newell et al. |
| 2022/0061674 A1 | 3/2022 | Park et al. |
| 2023/0104844 A1* | 4/2023 | Tanaka ................... G01K 1/143 |
| | | 374/29 |

FOREIGN PATENT DOCUMENTS

| | | | |
|---|---|---|---|
| CN | 112763099 A | 5/2021 | |
| CN | 112798127 A | 5/2021 | |
| JP | 2018-21833 A | 2/2018 | |
| WO | 2017/001701 A1 | 1/2017 | |
| WO | 2017/062923 A1 | 4/2017 | |
| WO | WO-2021199379 A1 * | 10/2021 | ............. G01K 1/143 |

\* cited by examiner

ELECTRONIC DEVICE AND METHOD OF ESTIMATING CORE BODY TEMPERATURE USING THE SAME

CROSS-REFERENCE TO RELATED APPLICATION(S)

This application claims priority from Korean Patent Application No. 10-2022-0082789, filed on Jul. 5, 2022, in the Korean Intellectual Property Office, the disclosure of which is incorporated herein by reference in its entirety.

BACKGROUND

1. Field

Apparatuses and methods consistent with example embodiments relate to measuring core body temperature using an electronic device.

2. Description of the Related Art

Generally, body temperature is one of four vital signs and has very important clinical significance. A body temperature sensor may be applied to various applications, such as checking infections in patients, thermal side effects of medications, or time of ovulation in women, and the like. However, a difference between skin temperature and core body temperature may occur due to external temperature, such that it is difficult to measure the core body temperature by using a portable device such as a wearable device. General body temperature sensors may be classified into contact type sensors and non-contact type sensors. Examples of the contact type sensor may include a sensor for detecting a change in electrical resistance, such as a Resistance Temperature Detector (RTD), a thermistor, etc., a thermocouple for detecting electromotive force, and the like. Further, examples of the non-contact type sensor may include a thermopile, a micro-bolometer, etc., which measure body temperature by detecting infrared rays radiating from a body surface. A general body temperature measurement technology is significantly affected by a change in environment factors affecting heat transfer, such as a change in external ambient temperature, humidity, air flow, and the like.

SUMMARY

According to an aspect of the present disclosure, an electronic device may include: a first temperature sensor configured to measure a first temperature of body skin of a user; a second temperature sensor configured to measure a second temperature inside a main body of the electronic device; a thermal resistance structure having a thermal resistance so that allows a difference between the first temperature and the second temperature to be greater than or equal to a predetermined threshold value; and at least one processor configured to obtain a skin heat flux based on the first temperature and the second temperature, and estimate a core body temperature of the user based on the first temperature and the skin heat flux.

At least one of the first temperature sensor and the second temperature sensor may be a contact-type temperature sensor comprising a thermistor.

The first temperature sensor and the second temperature sensor may be arranged in a thickness direction of the main body of the electronic device.

The thermal resistance structure may have the thermal resistance that corresponds to a thermal resistance parameter including a thickness, a thermal conductivity, and a cross-sectional area of the thermal resistance structure.

The thermal resistance structure may include: a first circuit board on which the first temperature sensor is disposed; a second circuit board which is spaced apart from the first circuit board, and on which the second temperature sensor is disposed; and heat transfer materials that are disposed between the first circuit board and the second circuit board, and that are in contact with the first circuit board and the second circuit board.

The heat transfer materials may include at least one of a C-clip and a pin connector.

A thermal resistance parameter of the thermal resistance structure may correspond to types of the first circuit board and the second circuit board, types of the heat transfer materials, distances between the heat transfer materials, a distance between the first circuit board and the second circuit board, cross-sectional areas of the first circuit board and the second circuit board, and board contact areas of the heat transfer materials.

The thermal resistance parameter may include the distances between the heat transfer materials and the distance between the first circuit board and the second circuit board, as a thickness parameter of the thermal resistance structure.

The thermal resistance parameter may include a thermal conductivity of at least one of the first circuit board and the second circuit board, and thermal conductivities of the heat transfer materials, as a thermal conductivity parameter of the thermal resistance structure.

The thermal resistance parameter may include contact areas between the heat transfer materials and each of the first circuit board and the second circuit board, and a cross-sectional area of at least one of the first circuit board and the second circuit board, as a cross-section area parameter of the thermal resistance structure.

The at least one processor may be further configured to estimate the skin heat flux based on the difference between the first temperature and the second temperature.

The electronic device may include a heat flux sensor disposed in the main body and configured to estimate a first heat flux, wherein the at least one processor may be further configured to estimate a second heat flux based on the difference between the first temperature and the second temperature, and obtain the skin heat flux based on the first heat flux and the second heat flux.

The at least one processor may be further configured to estimate the core body temperature based on the first temperature and the skin heat flux by using a predefined body temperature estimation model.

The electronic device may include a display configured to output at least one of the first temperature, the second temperature, the core body temperature, core body temperature change information during a predetermined period, and body temperature guidance information.

According to another aspect of the present disclosure, there is provided a method of estimating a core body temperature in an electronic device, the method including: by a first temperature sensor, measuring a first temperature of body skin of a user; by a second temperature sensor, measuring a second temperature inside a main body of the electronic device, the main body comprising a thermal resistance structure having a thermal resistance that allows a difference between the first temperature and the second temperature to be greater than or equal to a predetermined threshold value; obtaining a skin heat flux based on the first temperature and the second temperature; and estimating the core body temperature of the user based on the first temperature and the skin heat flux.

The thermal resistance structure may have the thermal resistance that corresponds to a thermal resistance parameter of the thermal resistance structure including a thickness, a thermal conductivity, and a cross-sectional area of the thermal resistance structure.

The obtaining of the skin heat flux may include estimating the skin heat flux based on the difference between the first temperature and the second temperature.

The obtaining of the skin heat flux may include: by a heat flux sensor, measuring a first heat flux; estimating a second heat flux based on the difference between the first temperature and the second temperature; and obtaining the skin heat flux based on the first heat flux and the second heat flux.

According to another aspect of the present disclosure, a wearable device may include: a main body having a body contact surface; a plurality of temperature sensors configured to measure a first temperature of body skin of a user and a second temperature inside the main body, when the body skin of the user comes into contact with the body contact surface; a thermal resistance structure having a thermal resistance that allows a difference between the first temperature and the second temperature to be greater than or equal to a predetermined threshold value; and at least one processor configured to perform predetermined operations based on temperature data measured by the plurality of temperature sensors.

The predetermined operations may include at least one of transmitting the temperature data to another electronic device, determining a measurement state based on the temperature data, estimating core body temperature based on the temperature data, generating guidance information based on the temperature data, and outputting a processing result.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
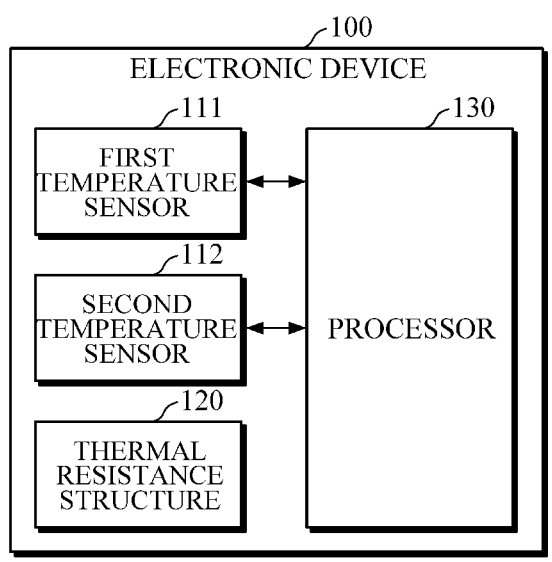
FIG. 1 is a block diagram illustrating an electronic device according to an embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms "first," "second," etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

An electronic device according to various embodiments of the present disclosure which will be described below may include, for example, at least one of a wearable device, a smartphone, a tablet PC, a mobile phone, a video phone, an electronic book reader, a desktop computer, a laptop computer, a netbook computer, a workstation, a server, a personal digital assistant (PDA), a portable multimedia player (PMP), an MPEG-1 Audio Layer-3 (MP3) player, a medical device, and a camera. The wearable device may include at least one of an accessory type wearable device (e.g., wristwatch, ring, bracelet, anklet, necklace, glasses, contact lens, or head mounted device (HMD)), a textile/clothing type wearable device (e.g., electronic clothing), a body-mounted type wearable device (e.g., skin pad or tattoo), and a body implantable type wearable device. However, the wearable device is not limited thereto and may include, for example, various portable medical measuring devices (antioxidant measuring device, blood glucose monitor, heart rate monitor, blood pressure measuring device, thermometer, etc.), magnetic resonance angiography (MRA), magnetic resonance imaging (MRI), computed tomography (CT), imaging system, ultrasonic system, etc.), and the like. However, the electronic device is not limited to the above devices.

Figure 2A:
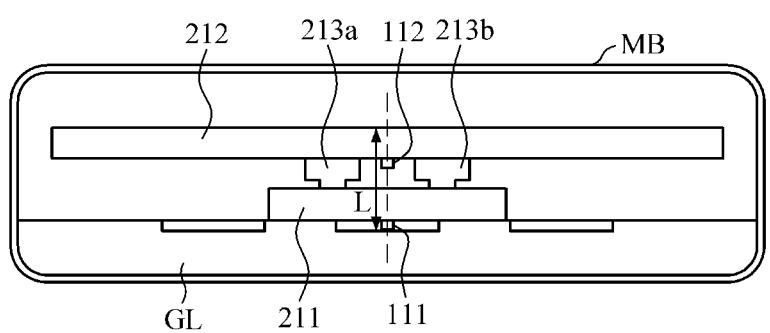
FIGS. 2A and 2B are diagrams explaining the arrangement of temperature sensors and a thermal resistance structure in an electronic device according to an embodiment of the present disclosure.
Figure 2B:
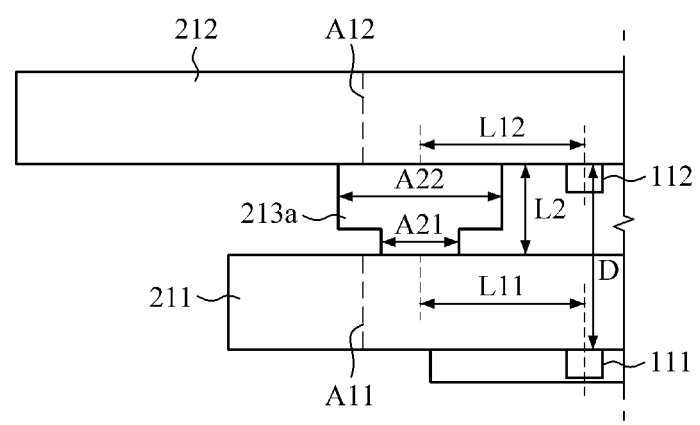

FIG. 1 is a block diagram illustrating an electronic device according to an embodiment of the present disclosure. FIGS. 2A and 2B are diagrams explaining the arrangement of temperature sensors and a thermal resistance structure in an electronic device according to an embodiment of the present disclosure.

Referring to FIG. 1, an electronic device 100 includes a first temperature sensor 111, a second temperature sensor 112, a thermal resistance structure 120, and a processor 130.

Referring to FIG. 2A, the first temperature sensor 111 may be disposed adjacent to a body contact surface GL of a main body case MB, and may measure a body skin temperature (hereinafter referred to as a "first temperature") during contact with a user's body. All or a portion of the body contact surface GL may be formed of a material such as glass. In particular, a body part may be a surface of the wrist that is adjacent to the radial artery and an upper part of the wrist where venous blood or capillary blood passes, or a peripheral part of the body with high blood vessel density, such as fingers, toes, ears, and the like. However, the body part is not limited thereto.

The second temperature sensor 112 is spaced apart from the first temperature sensor 111 in the main body case MB. As illustrated in FIG. 2A, the second temperature sensor 112 may be disposed relatively further away from the body contact surface GL of the main body case MB than the first temperature sensor 111, and may measure temperature inside the main body MB (hereinafter referred to as a "second temperature").

Both the first temperature sensor 111 and the second temperature sensor 112 may be contact-type temperature sensors, e.g., a thermistor pair, but are not limited thereto, and the first temperature sensor 111 may be a non-contact temperature sensor, e.g., an infrared temperature sensor, and the second temperature sensor 112 may be a contact-type temperature sensor, e.g., a thermistor.

The first temperature sensor 111 and the second temperature sensor 112 may be attached to the thermal resistance structure 120 in the main body case MB. The first temperature sensor 111 and the second temperature sensor 112 may be vertically arranged in a straight line, but are not limited thereto, and by changing the type, distance, arrangement, or shape of the thermal resistance structure 120, the first and second temperature sensors may be spaced apart at various positions. For example, the first temperature sensor 111 may be disposed at a distance of 10 mm or less from the body contact surface of the main body case MB, and the second temperature sensor 112 may be disposed at a distance of 10 mm or less from the first temperature sensor 111. However, this is merely an example, and distances and positions in the arrangement of the first and second temperature sensors 111 and 112 may be changed variously according to the size and shape of a form factor of the electronic device 100, a structure change of the thermal resistance structure 120, and the like.

The thermal resistance structure 120 may have effective thermal resistance so that a difference between a first temperature, measured by the first temperature sensor 111, and a second temperature, measured by the second temperature sensor 112, may be maintained at a predetermined level or higher. The thermal resistance has a property of hindering heat transfer of a material. A the heat resistance of the thermal resistance structure 120 increases, a temperature difference between the first temperature and the second temperature may increase. Accordingly, among thermal resistances, at which a difference between the first temperature and the second temperature is greater than a threshold value (e.g., 0.3), a maximum value may be defined as the effective thermal resistance.

Generally, in an environment where the core body temperature is actually measured by an electronic device, a temperature difference is highly likely to decrease due to various heat sources, heat build-up, or the like. Accordingly, the thermal resistance structure 120 is configured to have effective thermal resistance, so that the temperature difference is at a significant level and falls outside an error range, thereby improving the accuracy of estimating the core body temperature based on a heat flux.

Referring to FIG. 2A, the thermal resistance structure 120 may include a first board (e.g., a first circuit board) 211 disposed adjacent to the body contact surface GL of the main body case MB, a second board (e.g., a second circuit board) 212 spaced apart from the first board 211, and heat transfer materials 213a and 213b connecting the first board 211 and the second board 212.

The first board 211 and the second board 212 may be hard printed circuit boards (PCBs), flexible PCBs (fPCBs), etc., but are not limited thereto. The first temperature sensor 111 may be disposed on the first board 211, and the second temperature sensor 212 may be disposed on the second board 212. At least one of the first board 211 and the second board 212 may be omitted, in which case the temperature sensors 111 and 112 may be disposed at another structure (e.g., battery, internal support, etc.) in the main body case MB.

The heat transfer materials 213a and 213b are not necessarily two in number as illustrated herein, and one or more thereof may be disposed. The heat transfer materials 213a and 213b may be C-clips and/or pin (e.g., pogo pin) connectors, and may further include an insulator and the like. However, the heat transfer materials 213a and 213b are not limited thereto, and an air-filled structure may also be provided without using a separate heat transfer material.

The thermal resistance structure 120 may have a configuration (e.g., size, thickness, distance, shape, contact surface, and the like of the first board 211, the second board 212, and the heat transfer material 213) that allows the thermal resistance structure 120 to provide a target effective thermal resistance, and the thermal resistance structure 120 may be mounted during manufacture of the electronic device 100.

In this case, the effective thermal resistance may be determined based on a target value at which a temperature difference between the first temperature and the second temperature is to be maintained. In this case, a change in temperature difference according to a change in thermal resistance, i.e., a relationship between the thermal resistance and temperature difference may be specified in advance through experiments, and the specified data may be defined in the form of a matching table or a linear/non-linear function. For example, once a target threshold value is determined for a temperature difference, thermal resistances may be selected, at which the temperature difference is greater than or equal to the threshold value, by reference to the specified data, and among the selected thermal resistances, a maximum possible thermal resistance for the thermal resistance structure 120 may be determined as the effective thermal resistance by considering various conditions, such as the size of a form factor and the structure of the electronic device 100, and the like.

FIG. 2B is a diagram illustrating a portion of the arrangement of the temperature sensors 111 and 112 and the thermal resistance structure 120 illustrated in FIG. 2A, for convenience of explanation. Hereinafter, in the case where a plurality of heat transfer materials 213a and 213b are disposed as illustrated in FIG. 2A, examples of the heat transfer material 213a described with reference to FIG. 2B may also be applied to another heat transfer material 213b.

Thermal resistance may be defined as a relationship between thermal resistance parameters (e.g., thickness, thermal conductivity, and cross-sectional area), as shown in the following Equation 1.

$$R = \frac{L}{kA} \quad \text{[Equation 1]}$$

Herein, R denotes the thermal resistance, L denotes the thickness, k denotes the thermal conductivity, and A denotes the cross-sectional area. That is, the thermal resistance R has a property of hindering heat transfer of a material and may be defined as a value proportional to the thickness L of the thermal resistance structure 120 and inversely proportional to the thermal conductivity k and the cross-sectional area A thereof.

Referring to FIGS. 2A and 2B, any one or a combination of two or more of elements related to the thermal resistance parameters of the thermal resistance structure 120 (e.g., type of the boards 211 and 212, type of the heat transfer materials 213a and 213b, distance between the heat transfer materials 213a and 213b, distance between the boards 211 and 212, cross-sectional areas of the boards 211 and 212, contact areas of the heat transfer materials 213a and 213b with the boards, etc.) may be defined as the respective thermal resistance parameters.

The type (e.g., hard PCB or fPCB) of the boards 211 and 212 and the type of the heat transfer material 213 (e.g., C-clip, pogo pin, air, etc.) may vary in relation to the thermal conductivity k as the thermal resistance parameter. For example, a statistical value of the thermal conductivities of the boards 211 and 212 and the thermal conductivities of the heat transfer materials 213a and 213b may be defined as the thermal conductivity k which is the thermal resistance parameter. For example, a total average of the thermal conductivities of the boards 211 and 212 and the thermal conductivities of the heat transfer materials 213a and 213b, or a sum of an average of the thermal conductivities of the boards 211 and 212 and an average of the thermal conductivities of the heat transfer materials 213a and 213b may be defined as the thermal conductivity k which is the thermal resistance parameter. Alternatively, if the boards 211 and 212 are of the same type or if any one board 211 is predefined, and/or if the heat transfer materials 213a and 213b are of the same type or if any one heat transfer material 231a is predefined, a sum of the average of the thermal conductivities of the boards 211 and 212 and the thermal conductivity of the heat transfer material 213a, a sum of the thermal conductivity of the board 211 and the average of the thermal conductivities of the heat transfer materials 213a and 213b, or a sum of the thermal conductivity of the board 211 and the thermal conductivity of the heat transfer material 213a may be defined as the thermal conductivity k which is the thermal resistance parameter. However, the thermal conductivity k is not limited thereto.

The distance of the heat transfer material 213a may indicate how far the heat transfer material 213a is away from the temperature sensors 11I and 112, and may vary in relation to the thickness L as the thermal resistance parameter. For example, the distance of the heat transfer material 213a may include distances L11 and L12 between the heat transfer material 213a and the temperature sensors 111 and 112, as illustrated in FIG. 2B. In FIG. 2B, a distance between a middle point of the heat transfer material 213a and a middle point of the respective temperature sensors 111 and 112 is defined as the distance of the heat transfer material 213a. In this case, as illustrated herein, the two distances L11 and L12 may be equal to each other, but are not limited thereto, and may be defined as, for example, distances between side surfaces facing each other, in which case the two distances may be different from each other depending on various shapes of the heat transfer material 213a. In addition, a distance between the boards 211 and 212 indicates a distance L2 between the first board 211 and the second board 212, and may vary in relation to the thickness L as the thermal resistance parameter.

For example, a statistical value of the distances L11 and L12 of the heat transfer material 213a and the distance L2 between the boards 211 and 212 may be defined as the thickness L which is the thermal resistance parameter. For example, a total average of the distances L11 and L12 of the heat transfer material 213a and the distance L2 between the boards 211 and 212, or a sum of an average of the distances L11 and L12 of the heat transfer material 213a and the distance L2 between the boards 211 and 212 may be defined as the thickness L which is the heat transfer parameter. Alternatively, if the distances L11 and L12 of the heat transfer material 213a are the same or if any one distance L11 is predefined, a sum of the distance L11 of the heat transfer material 213a and the distance L2 between the boards 211 and 212 may be defined as the thickness L which is the thermal resistance parameter. As illustrated in FIG. 2A, if the other heat transfer material 213b is further provided, distances of the heat transfer material 213b are also considered, and if the heat transfer material 213b is disposed symmetrical to the heat transfer material 213a, such that the distances thereof are the same, the heat transfer material 213b may be omitted. However, the thickness L is not limited thereto.

Cross-sectional areas of the boards 211 and 212 include a cross-sectional area A11 of the first board 211 and/or a cross-sectional area A12 of the second board 212, and may vary in relation to a cross-sectional area A as the thermal resistance parameter. For example, if the boards 211 and 212 have rectangular cross-sections, the square of a thickness may be defined as the cross-sectional areas of the boards 211 and 212. In addition, board contact areas of the heat transfer material 213a include board contact areas A21 and A22 of the heat transfer material 213a that is in contact with the respective boards 211 and 212, and may vary in relation to the cross-sectional area A as the thermal resistance parameter.

For example, a statistical value of the cross-sectional areas A11 and A12 of the boards 211 and 212 and the board contact areas A21 and A22 of the heat transfer material 213a may be defined as the cross-sectional area A which is the thermal resistance parameter. For example, a total average of the cross-sectional areas A11 and A12 and the board contact areas A21 and A22, or a sum of an average of the cross-sectional areas A11 and A12 and an average of the board contact areas A21 and A22 may be defined as the cross-sectional area A which is the thermal resistance parameter. Alternatively, if the cross-sectional areas A11 and A12 are the same or if any one cross-sectional area A11 is predefined, and/or if the board contact surfaces A21 and A22 are the same or if any one board contact surface A21 is predefined, a sum of the cross-sectional area A11 and an average of the board contact areas A21 and A22, a sum of an average of the cross-sectional areas A11 and A12 and the board contact area A21, or a sum of the cross-sectional area A11 and the board contact area A21 may be defined as the cross-sectional area A which is the thermal resistance parameter. As illustrated in FIG. 2A, if the other heat transfer material 213b is further provided, a contact area of the heat transfer material 213b may also be considered, and if the heat transfer material 213b is formed in the same shape as the heat transfer material 213a, the heat transfer material 213b may be omitted. However, the cross-sectional area A is not limited thereto.

Referring to FIG. 2B, the first temperature sensor 111 and the second temperature sensor 112 are spaced apart from each other with a distance D in the thickness direction of the main body case MB. When the electronic device 100 is implemented as a smart watch, there may be restrictions on the height of each of the temperature sensors 111 and 112 and the distance D between the temperature sensors 111 and 112 since the area of the smart watch that can accommodate the temperature sensors 111 and 112 is small.

For example, the height of the area of the smart watch that can accommodate the temperature sensors 111 and 112 may be in a range from 1 mm to 1.5 mm. Given the limited height of the area in the smartwatch, the distance D between the temperature sensors 111 and 112 may decrease as the height of the temperature sensors 111 and 112 increases, while a certain distance between the two temperature sensors 111 and 112 is required to obtain a minimum temperature difference (e.g., 0.3° C.) between the two temperature sensors 111 and 112 and thereby to estimate a body temperature based on the temperature difference. Since the temperature sensors 111 and 112 may have some error rate (e.g., ±0.1° C.), it may be difficult to reliably measure the temperature difference between the two temperature sensors 111 and 112 when a target temperature difference between the two temperature sensors 111 and 112 is set to be less than 0.3° C. Based on such understanding, a minimum target temperature difference between the two temperature sensors 111 and 112 may be set to 0.3° C., and a heat transfer simulation has been conducted by changing the height of the temperature sensors 111 and 112 and the distance D between the temperature sensors 111 and 112, as shown below in Table 1.

TABLE 1

| Area height H | Height of Temperature Sensor (mm) | Distance D between Temperature Sensors (mm) | Temperature Difference (° C.) |
| --- | --- | --- | --- |
| 1 mm | 0.1 | 0.8 | 0.648 |
|  | 0.2 | 0.6 | 0.486 |
|  | 0.3 | 0.4 | 0.324 |
|  | 0.4 | 0.2 | 0.162 |
| 1.1 mm | 0.1 | 0.9 | 0.730 |
|  | 0.2 | 0.7 | 0.567 |
|  | 0.3 | 0.5 | 0.405 |
|  | 0.4 | 0.3 | 0.243 |
| 1.2 mm | 0.1 | 1 | 0.811 |
|  | 0.2 | 0.8 | 0.648 |
|  | 0.3 | 0.6 | 0.486 |
|  | 0.4 | 0.4 | 0.324 |
|  | 0.5 | 0.2 | 0.162 |
| 1.3 mm | 0.1 | 1.1 | 0.892 |
|  | 0.2 | 0.9 | 0.730 |
|  | 0.3 | 0.7 | 0.567 |
|  | 0.4 | 0.5 | 0.405 |
|  | 0.5 | 0.3 | 0.243 |
| 1.4 mm | 0.1 | 1.2 | 0.973 |
|  | 0.2 | 1 | 0.811 |
|  | 0.3 | 0.8 | 0.648 |
|  | 0.4 | 0.6 | 0.486 |
|  | 0.5 | 0.4 | 0.324 |
|  | 0.6 | 0.2 | 0.162 |
| 1.5 mm | 0.1 | 1.3 | 1.054 |
|  | 0.2 | 1.1 | 0.892 |
|  | 0.3 | 0.9 | 0.730 |
|  | 0.4 | 0.7 | 0.567 |
|  | 0.5 | 0.5 | 0.405 |
|  | 0.6 | 0.3 | 0.243 |

Referring to Table 1 above, when a target temperature difference between the two temperature sensors 111 and 112 is greater than or equal to 0.3° C., the height of each of the temperature sensors 111 and 112 may be set to have a minimum height of 0.3 mm (i.e., 0.3 mm or greater, and preferably from 0.3 mm to 0.5 mm), and the distance between the temperature sensors 111 and 112 may be set to a minimum height of 0.4 mm or (i.e., 0.4 mm or greater, and preferably from 0.4 mm to 1.3 mm).

The first temperature sensor 111 may be disposed as close as possible to the contact surface, and the second temperature sensor 112 may be disposed as close as possible to the display panel to provide a relatively accurate temperature estimation.

As described in the above examples, a relationship between a change in elements related to heat resistance parameters and a change in heat resistance, and/or a relationship between the change in the elements, the change in heat resistance, and a temperature difference may be predefined and specified through experiments. The specified relationship may be defined in the form of a matching table or a linear/non-linear function. In this case, the heat resistance may be normalized by defining a virtual case, in which there are no boards and heat transfer materials, as the electronic device 100 illustrated in FIGS. 1, 2A, and 2B.

According to this embodiment, by referring to the specified relationship during manufacture of the electronic device 100, a maximum thermal resistance is determined, as the effective thermal resistance, among thermal resistances at which a temperature difference is greater than or equal to a threshold value, and the thermal resistance structure 120 may be configured to have the determined effective thermal resistance, while fitting the structure, measurement environment, and size of a form factor, and the like of the electronic device 100.

For example, if a distance between the boards 211 and 212 may not increase due to a limited size of a form factor, the thermal resistance structure 120 may be configured to have the effective thermal resistance by adjusting the elements of the thermal resistance structure in various manners, such as increasing the distances of the heat transfer materials 213a and 213b, changing the type of the boards 211 and 212 and/or the heat transfer materials 213a and 213b to materials having low thermal conductivity, or minimizing the contact areas of the heat transfer materials 213a and 213b and/or the cross-sectional areas of the boards 211 and 212, and the like.

Referring back to FIG. 1, the processor 130 may be connected to the temperature sensors 111 and 112 to control the temperature sensors 111 and 112, and may perform various operations by using temperature data received from the temperature sensors 111 and 112. The operations are not particularly limited, and the processor 130 may perform operations (e.g., estimating a core body temperature, determining a temperature measurement state, and/or generating a variety of guidance information, etc.) as will be described below.

For example, the processor 130 may estimate a user's core body temperature by using first and second temperatures received from the temperature sensors 111 and 112. Here, the core body temperature may be pulmonary arterial temperature while blood is pumped from the heart. For example, the processor 130 may estimate heat flux based on the first temperature and the second temperature, and may estimate the core body temperature by using the estimated heat flux and the first temperature.

Assuming that a flow of heat is a current, a heat transfer properly of a material is resistance, and a heat flux is a voltage, the flow of heat may be expressed by an equation according to Bohr's law (V=IR). In this case, assuming that heat transfer from the wrist to a surface opposite to the body contact surface of the main body occurs in a series circuit, the heat flux may be estimated based on a difference ($T_1-T_2$) between the first temperature $T_1$ and the second temperature $T_2$, and the following Equation 2 may be derived according to Ohm's law (V=IR). Equation 2 may be rewritten as the following Equation 3.

$$T_1 - T_2 = \beta(T_{core} - T_1) \qquad \text{[Equation 2]}$$

$$T_{core} = T_1 + \frac{T_1 - T_2}{\beta} \qquad \text{[Equation 3]}$$

Herein, $T_{core}$ denotes the core body temperature; $T_1$ and $T_2$ denote the first temperature and the second temperature, respectively; β denotes a heat transfer coefficient based on physical properties and is a value input in advance.

In another example, by analyzing the temperature data received from the temperature sensors 111 and 111 the processor 130 may determine a temperature measurement environment (e.g., a body contact state with the body contact surface of the main body case). For example, if predetermined conditions are satisfied, such as the case where a first temperature falls outside a first threshold range, the case where a second temperature falls outside a second threshold range, or the case where a difference between the first temperature and the second temperature falls outside a third threshold range, the processor 130 may determine that the temperature data is abnormal. Upon determining that the temperature data is abnormal, the processor 130 may provide guidance information for a user so that a temperature measurement environment (e.g., body contact state) may return to normal.

In another example, upon estimating the core body temperature, the processor 130 may determine whether the estimated core body temperature is low, normal or high, and based on the determination, the processor 130 may generate warning information and/or guidance information such as recommended actions for a user to take. In addition, by analyzing core body temperature data continuously estimated during a predetermined period of time, the processor 130 may generate an analysis result (e.g., a core body temperature change graph and the like). However the processor 130 is not limited to the above examples.

The aforementioned various examples of temperature measurement and/or core body temperature estimation may be performed continuously without a user's awareness. Here, the term "continuously" means that estimation not only continues at very short time intervals, but is also repeated at discrete time intervals (e.g., 1 min., 5 min., 1 h, etc.). In this case, there may be predetermined conditions for temperature measurement and/or core body temperature estimation. The processor 130 may control the temperature sensors 111 and 112 according to the predetermined conditions, and may continuously estimate the core body temperature by using temperature data measured by the temperature sensors 111 and 112.

For example, the temperature sensors 111 and 112 may continuously measure temperature while the electronic device 100 is turned on, and the processor 130 may estimate the core body temperature in real time by receiving in real time the continuously measured temperature data from the temperature sensors 111 and 112. In another example, the temperature sensors 111 and 112 and the processor 130 may continuously perform temperature measurement and core body temperature estimation during a predetermined period of time (e.g., 30 min., 1 h, etc.) one or more times a day (e.g., 8 a.m., 2 p.m., 4 p.m., 10 p.m., every two hours, etc.). In yet another example, the temperature sensors 111 and 112 may continuously measure temperature while the electronic device is turned on, and the processor 130 may estimate the core body temperature at predetermined time intervals. In yet another example, the temperature sensors 111 and 112 may continuously measure temperature while the electronic device is turned on, and the processor 130 may analyze the temperature data received in real time from the temperature sensors 111 and 112. As described above, based on the analysis result, if the temperature data is normal, the processor 130 may determine that a body contact state is good and may continuously proceed with estimating the core body temperature. In yet another example, by analyzing sensor data collected by various sensors (e.g., camera, etc.) located inside the main body or at various positions of the main body case, the processor 130 may determine whether a body part is in contact with one surface of the main body, and may continuously measure temperature and/or estimate core body temperature during the contact.

The above examples are provided merely for better understanding of continuous estimation, and the present disclosure is not limited thereto. In addition, various examples of core body temperature estimation described in the present disclosure are not necessarily limited to continuous core body temperature estimation without awareness, and an example of on-demand estimation of core body temperature may also be possible in response to a user's request. Further, both the continuous estimation without awareness and the on-demand estimation may also be performed at the same time.

Figure 3:
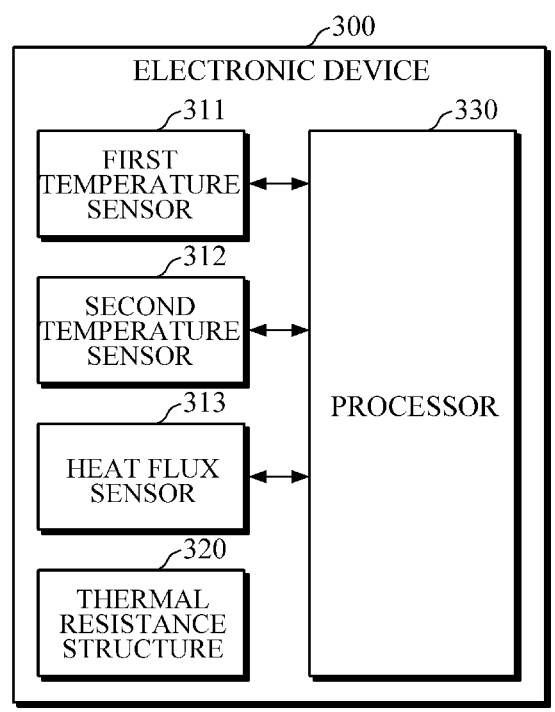
FIG. 3 is a block diagram illustrating an electronic device according to another embodiment of the present disclosure.

FIG. 3 is a block diagram illustrating an electronic device according to another embodiment of the present disclosure.

Referring to FIG. 3, an electronic device 300 includes a first temperature sensor 311, a second temperature sensor 312, a heat flux sensor 313, a thermal resistance structure 320, and a processor 330. The first temperature sensor 311, the second temperature sensor 312, the thermal resistance structure 320, and the processor 330 are described above, such that a redundant description thereof will be omitted.

The heat flux sensor 313 may be disposed on the body contact surface of the main body case or at a position adjacent to the body contact surface. The heat flux sensor 313 may be disposed on a side surface of the first temperature sensor 311 or the second temperature sensor 312, or may be disposed between the first temperature sensor 311 or the second temperature sensor 312. The heat flux sensor 313 may be a sensor for measuring heat flux by measuring a heat flow density, and may measure skin heat flux at a position in contact with or adjacent to the body skin. The heat flux sensor 313 may have a volume of 1×1×0.5 mm³ or less, but is not limited thereto.

The processor 330 may be connected to the temperature sensors 311 and 312 and the heat flax sensor 313 to receive the temperature data and the skin heat flux data, and may estimate a user's core body temperature by using the received temperature data and skin heat flux data.

For example, the processor 330 may estimate the heat flux based on a difference between the first temperature and the second temperature which are measured by the temperature sensors 311 and 312, and may estimate the skin heat flux by linearly combining the estimated heat flux and the heat flax measured by the heat flux sensor 313, as shown in the following Equation 4.

$$Q = W_{HFS}Q_{HFS} + W_{TH}Q_{TH} \qquad \text{[Equation 4]}$$

Herein, Q denotes a final skin heat flux; $Q_{HFS}$ denotes the heat flux measured by the heat flux sensor 313; $Q_{TH}$ denotes the heat flux estimated based on the first temperature and the second temperature; and $W_{HFS}$ and $W_{TH}$ are predetermined coefficients.

Upon obtaining the final skin heat flux, the processor 330 may obtain the core body temperature by combining the first temperature of the body skin and the skin heat flux, as shown in the following Equation 5.

$$T_{core}=T_1+Q \quad [\text{Equation 5}]$$

Herein, $T_{core}$ denotes the core body temperature, $T_1$ denotes the first temperature of the body skin, and Q denotes the final skin heat flux.

In this embodiment, the accuracy of estimating the core body temperature may be improved by correcting the heat flux, measured by the heat flux sensor 313, by using values measured by a plurality of temperature sensors disposed adjacent to the heat flux sensor 313, i.e., a temperature difference which is maintained at a predetermined level or higher by the thermal resistance structure 320.

Figure 4:
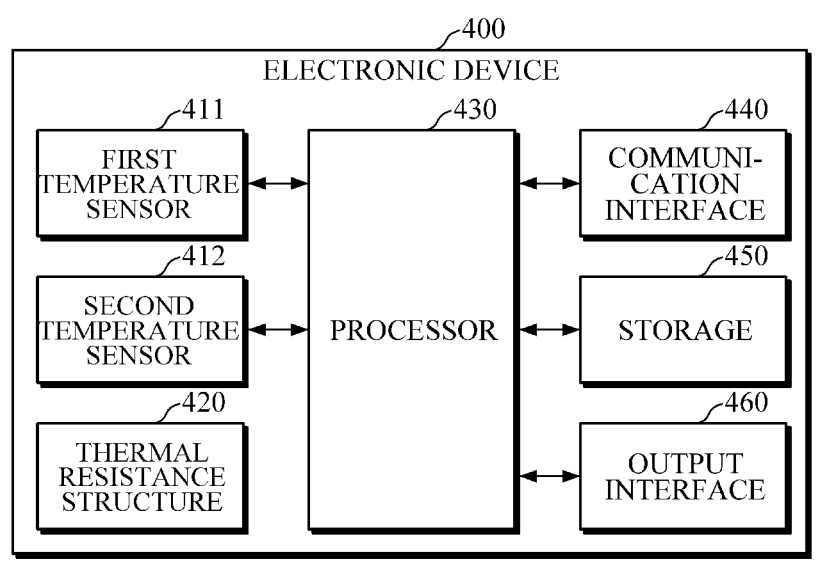
FIG. 4 is a block diagram illustrating an electronic device according to yet another embodiment of the present disclosure.

FIG. 4 is a block diagram illustrating an electronic device according to yet another embodiment of the present disclosure. FIGS. 5A to 5D are diagrams illustrating an example of providing body temperature information in an electronic device.

Referring to FIG. 4, an electronic device 400 includes a first temperature sensor 411, a second temperature sensor 412, a thermal resistance structure 420, a processor 430, a communication interface 440, a storage 450, and an output interface 460. The electronic device 400 may further include the heat flux sensor 313 of FIG. 3. Some of the communication interface 440, the storage 450, and the output interface 460 may be selectively omitted as needed. The first temperature sensor 411, the second temperature sensor 412, the thermal resistance structure 420, and the processor 430 are described above, such that a detailed description thereof will be omitted.

The communication interface 440 may receive a user's temperature data and/or core body temperature data from another electronic device (e.g., patch-type temperature measuring device, smartwatch, etc.). In this case, another electronic device may be an electronic device including a temperature sensor and a thermal resistance structure, as described above. Upon receiving the temperature data from another electronic device, the processor 430 may estimate the core body temperature by using the received temperature data.

In addition, the communication interface 440 may transmit the temperature data, measured by the temperature sensors 411 and 412, to another electronic device under the control of the processor 430. Further, the communication interface 440 may transmit processing results of the processor 430 (e.g., an estimated core body temperature value, a determination result of a temperature measurement state, generated guidance information, etc.) to another electronic device. In this case, the electronic device may perform various operations, such as estimating the core body temperature by using the received temperature data or outputting the received processing results, and the like.

The communication interface 440 may communication with another electronic device by using various wired and wireless communication techniques including Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, and the like. However, the communication techniques are not limited thereto.

The storage 450 may store various instructions for performing various functions, including core body temperature estimation, in the electronic device 400. In addition, the storage 450 may store reference data related to estimating the core body temperature, including a body temperature estimation algorithm, body temperature estimation model, etc., and/or user reference data including a user's age, height, weight, exercise information, health information, and the like. Further, the storage 450 may store various data processed and generated by the electronic device 400 (e.g., temperature data, estimated core body temperature value, temperature measurement state, heat flux, warning information, guidance information, data received from another electronic device, and the like). The processor 430 may refer to the instructions and various data stored in the storage 450.

The storage 450 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The output interface 460 may output the temperature data measured by the temperature sensors 411 and 413, the heat flux data measured by the heat flux sensor, the estimated heat flux value, the estimated core body temperature value, and the temperature measurement state of the processor 430, and/or guidance information such as warning/recommendations, etc., and may provide the data to a user.

Figure 5A:
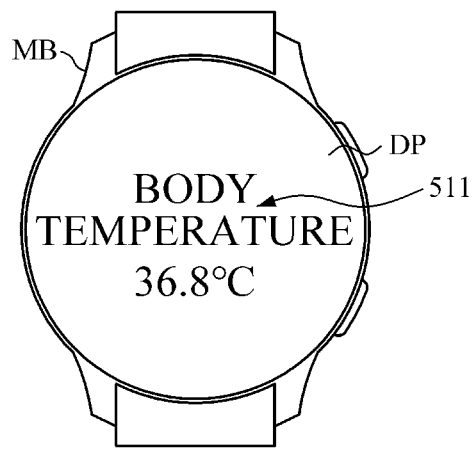
FIGS. 5A, 5B, 5C, and 5D are diagrams illustrating an example of providing body temperature information in an electronic device.
Figure 5B:
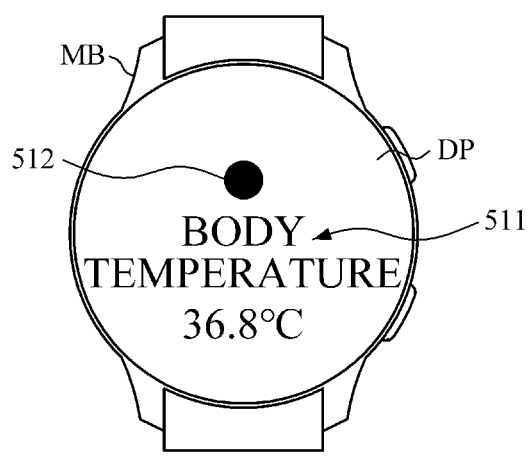
Figure 5C:
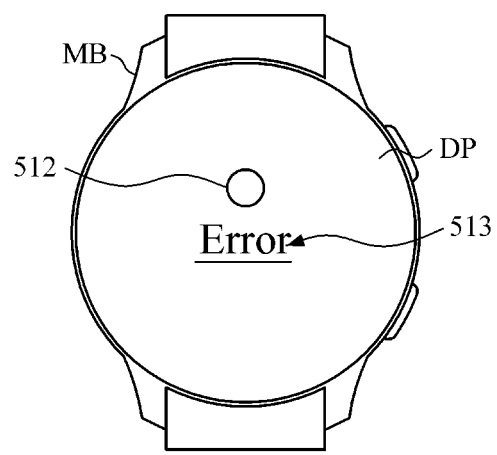
Figure 5D:
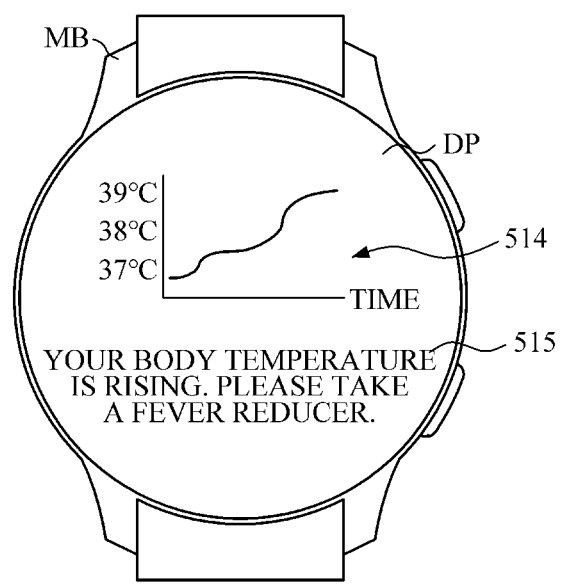

For example, referring to FIGS. 5A to 5D, the output interface 460 may output core body temperature information 511, estimated by the processor 430, to a display DP of the main body MB as illustrated in FIG. 5A. In this case, as illustrated in FIGS. 5B and 5C, the output interface 460 may further display a graphic object 512, indicating a temperature measurement state, in addition to the core body temperature information 511. FIG. 5B illustrates a case where the temperature measurement state is normal, and FIG. 5C illustrates a case where the temperature measurement state is abnormal, in which the temperature measurement states may be distinguished by using various methods, such as displaying the graphic object 512 in different colors and the like, so that a user may easily recognize the temperature measurement states. If the temperature measurement state is abnormal, the output interface 460 may output an error message 513. In addition, as illustrated in FIG. 5D, the output interface 460 may output a core body temperature change graph 514 to the display DP, so that a user may visually identify a change in core body temperature continuously estimated during a predetermined period of time (one hour, a day, a week, etc.). In this case, if a core body temperature change shows that the temperature rises above a threshold (e.g., 38° C.), the output interface 460 may output a recommended action 515 for the user to take. However, the output interface 460 is not limited to the above examples.

Figure 6:
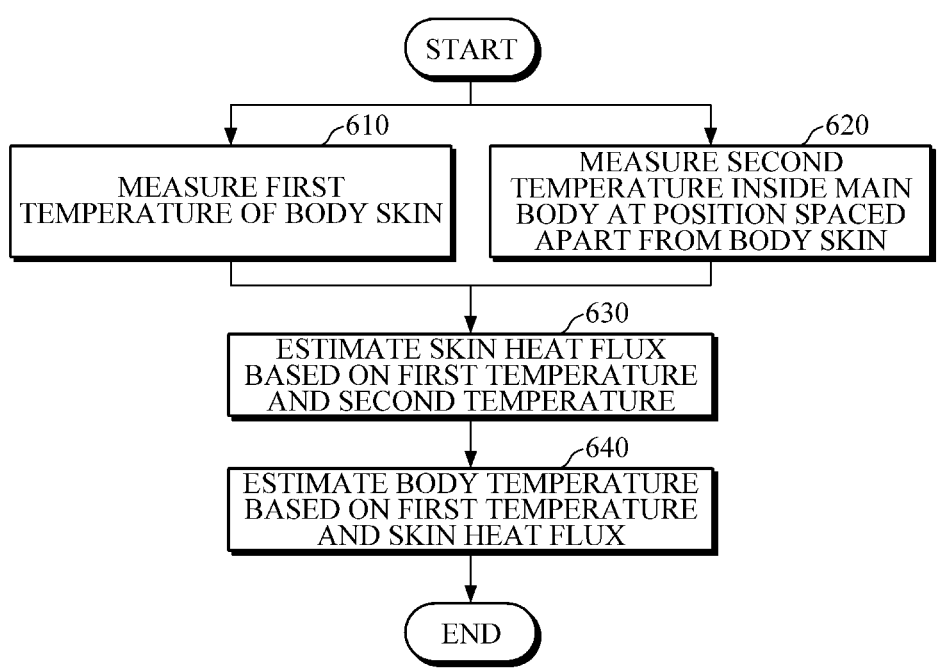
FIG. 6 is a flowchart illustrating a method of estimating core body temperature according to an embodiment of the present disclosure.

FIG. 6 is a flowchart illustrating a method of estimating core body temperature according to an embodiment of the present disclosure. The method of FIG. 6 is an example of a method of estimating core body temperature performed by the electronic devices 100 and 300 of FIG. 1 or FIG. 3, such that a detailed description thereof will be omitted.

First, the electronic device may measure a first temperature of body skin in operation 610 by using the first temperature sensor disposed adjacent to a body contact surface of the main body case when a user's body comes into contact with the body contact surface, and may measure a second temperature inside the main body in operation 620 by using the second temperature sensor spaced apart from the first temperature sensor in the main body. In this case, both the first and second temperature sensors may be thermistor-based contact-type temperature sensors.

Then, the electronic device may estimate skin heat flux based on the first temperature and the second temperature in operation 630. For example, the electronic device may estimate the skin heat flux based on a difference between the first temperature and the second temperature. As described above, by using a thermal resistance structure formed to have effective thermal resistance, the electronic device may maintain the difference between the first temperature and the second temperature at a predetermined level or higher. In this manner, the electronic device may improve the accuracy of estimating the core body temperature based on the heat flux.

Then, the electronic device may estimate the body temperature based on the first temperature and the skin heat flux in operation 640. As shown in the above Equation 3, by applying a heat transfer coefficient to the skin heat flux, and by linearly combining the skin heat flux and the first temperature of the body skin, the electronic device may obtain a core body temperature value.

Figure 7:
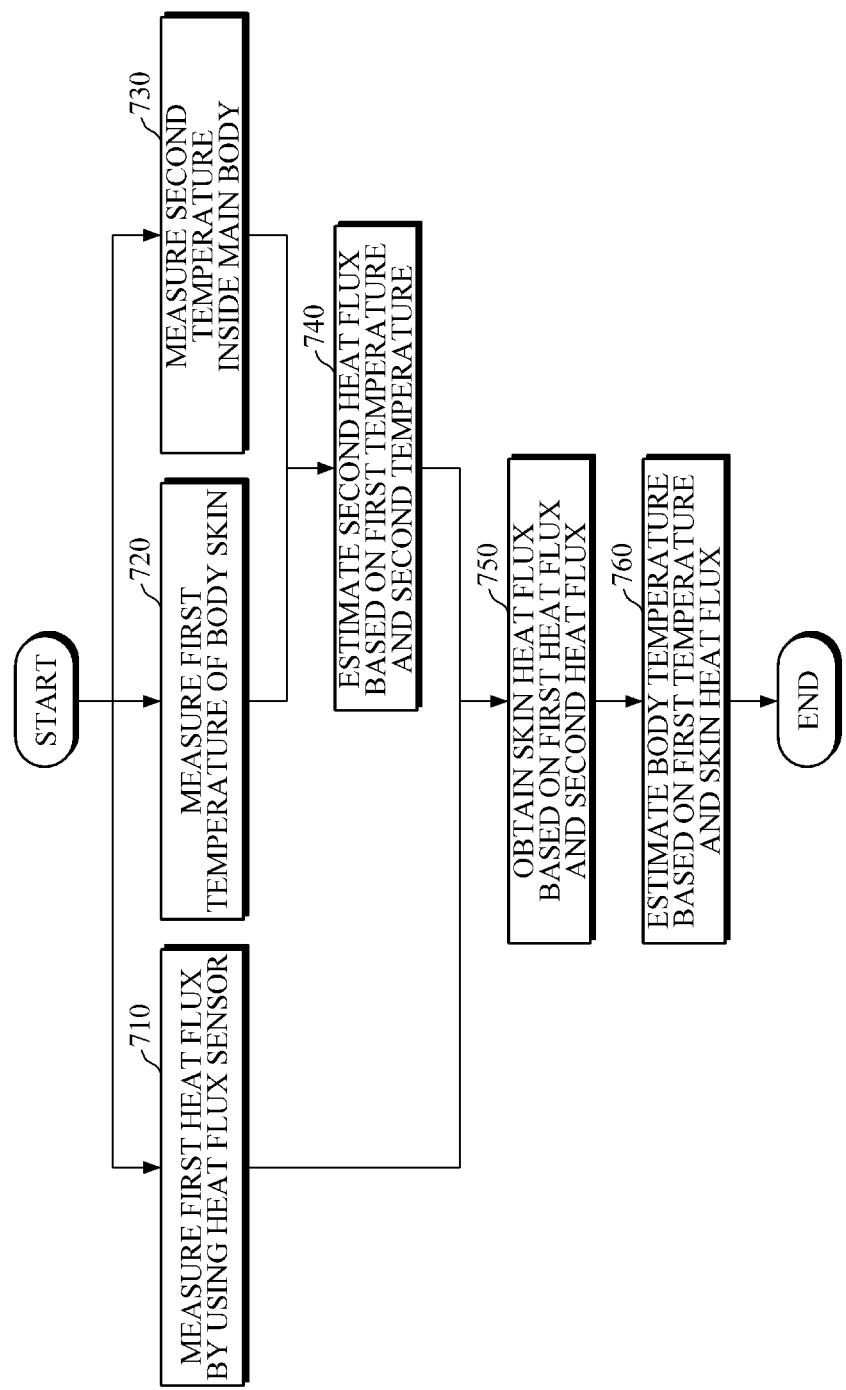
FIG. 7 is a flowchart illustrating a method of estimating core body temperature according to another embodiment of the present disclosure.

FIG. 7 is a flowchart illustrating a method of estimating core body temperature according to another embodiment of the present disclosure. The method of FIG. 7 is an example of a method of estimating core body temperature performed by the electronic devices 300 and 400 of FIG. 3 or FIG. 4, such that a detailed description thereof will be omitted.

First, the electronic device may measure a first heat flux in operation 710 by using a heat flux sensor disposed adjacent to a body contact surface of the main body case when a user's body comes into contact with the body contact surface. In addition, the electronic device may measure a first temperature of the body skin in operation 720 by using the first temperature sensor disposed adjacent to the heat flux sensor on the body contact surface of the main body case when the body comes into contact with the body contact surface, and may measure a second temperature inside the main body in operation 730 by using the second temperature sensor spaced apart from the first temperature sensor.

Then, the electronic device may estimate a second heat flux based on the first temperature and the second temperature in operation 740. For example, the electronic device may estimate the skin heat flux based on a difference between the first temperature and the second temperature. As described above, the electronic device includes the thermal resistance structure formed to have effective thermal resistance, such that the difference between the first temperature and the second temperature may be maintained at a predetermined level or higher. In this manner, the electronic device may improve the accuracy of estimating the core body temperature based on the heat flux.

Subsequently, the electronic device may obtain skin heat flux based on the first heat flux and the second heat flux in operation 750. As described above, by applying a heat transfer coefficient to each of the first heat flux and the second heat flux, and by linearly combining the first heat flux and the second heat flux, the electronic device may obtain a final skin heat flux.

Next, the electronic device may estimate the core body temperature in operation 760 based on the first temperature and the skin heat flux obtained in operation 750. As shown in the above Equation 5, by reflecting the skin heat flux in the first temperature of the body skin, the electronic device may obtain a body temperature value.

FIGS. 8 to 11 are diagrams illustrating examples of structures of the above electronic devices 100, 300, and 400. However, the present disclosure is not limited to these illustrated examples.

Figure 8:
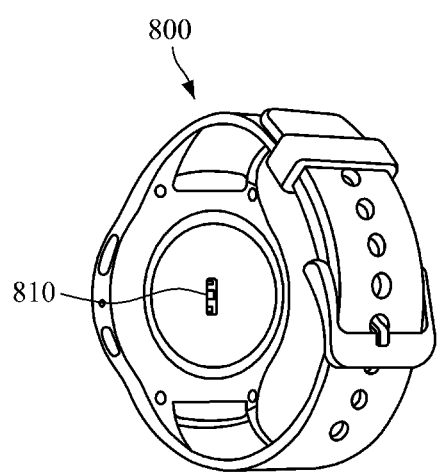
FIGS. 8 to 11 are diagrams illustrating examples of structures of an electronic device.

Referring to FIG. 8, the electronic device may be implemented as a wristwatch-type wearable device which includes a main body and a wrist strap. A display may be provided on a front surface of the main body MB, and may display various application screens including time information, received message information, estimated core body temperature information, and the like. A sensor device 810 may be disposed on a rear surface of the main body. The sensor device 810 may include a plurality of temperature sensors spaced apart at different distances from a wrist contact surface, and a thermal resistance structure having effective thermal resistance to maintain a temperature difference between temperature sensors at a predetermined level or higher. For example, the first temperature sensor 111, 311, and 411 may be provided on the wrist contact surface to be contacted with a wrist of a user, and the second temperature 112, 312, and 412 may be provided inside the main body MB. The electronic device may include various other sensors, for example such as a photoplethysmography (PPG) sensor to detect a PPG sensor and thereby to estimate a core body temperature based on measured temperatures and the PPG signal. A processor and various other components may be disposed in the main body case. The processor may perform various operations, such as estimating the core body temperature and the like, as described above.

Figure 9:
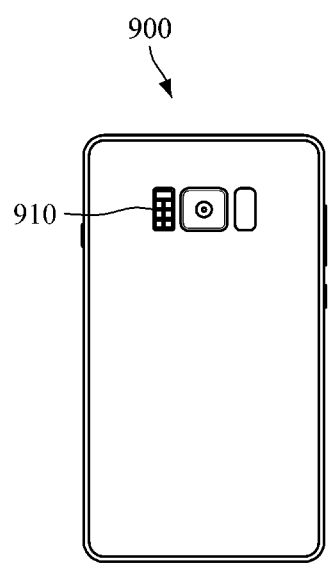

Referring to FIG. 9, the electronic device may be implemented as a mobile device 900 such as a smartphone.

The mobile device 900 may include a main body case and a display panel. The main body case may form an outer appearance of the mobile device 900. The main body case has a front surface, on which the display panel and a cover glass may be disposed sequentially, and the display panel may be exposed to the outside through the cover glass. A sensor device 910, a camera module and/or an infrared sensor, and the like may be disposed on a rear surface or a lateral surface of the main body. The sensor device 910 may include a plurality of temperature sensors spaced apart at different distances from a contact surface with a body part (e.g., finger), and a thermal resistance structure having effective thermal resistance to maintain a temperature difference between temperature sensors at a predetermined level or higher. A processor and various other components may be disposed in the main body case. The processor may perform various operations, such as estimating the core body temperature and the like, as described above.

Figure 10:
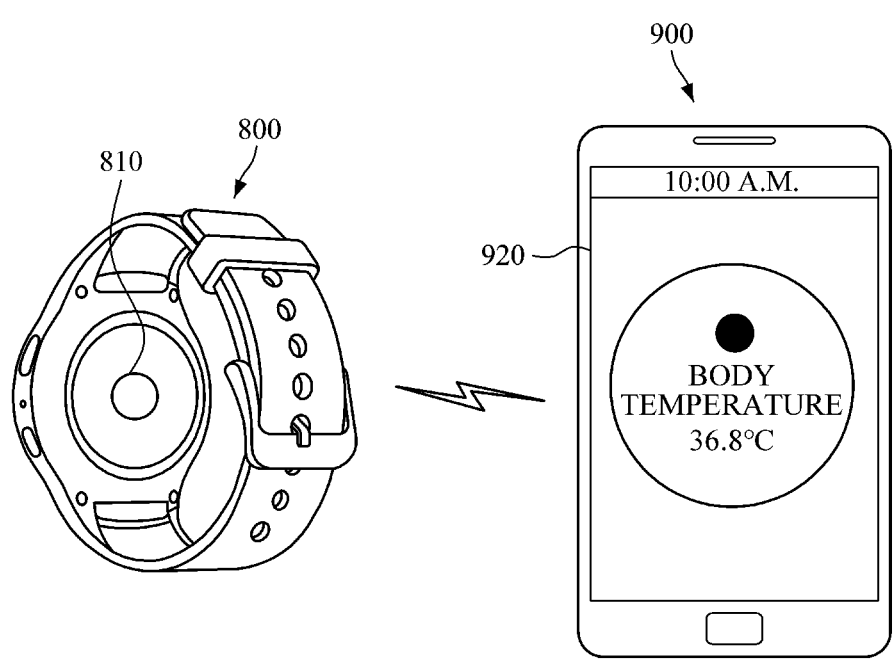

FIG. 10 is a diagram illustrating an example of estimating body temperature by connecting a smartwatch 800 and a smartphone 900. For example, the smartwatch 800 may estimate core body temperature, and the smartphone 900 may output a core body temperature estimation result and/or a temperature measurement state, which are received from the smartwatch 800, to a display 920. In another example, the smartwatch 800 may measure temperature, and the smartphone 900 may estimate the core body temperature by using temperature data received from the smartwatch 900, and may output an estimation result. The opposite case is also possible.

Figure 11:
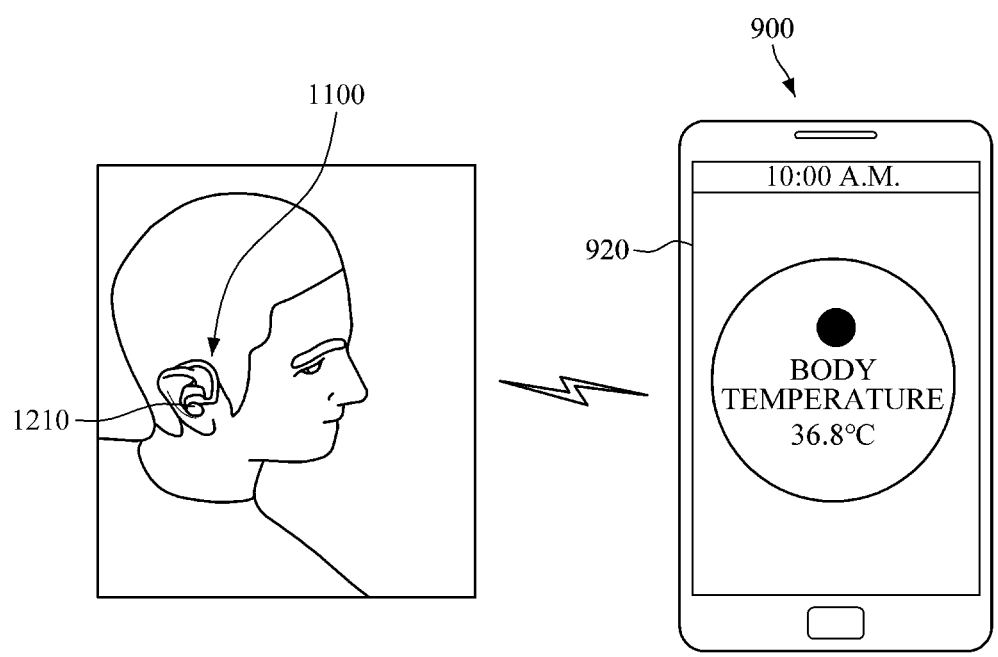

FIG. 11 is a diagram illustrating an example of estimating body temperature by connecting an ear-wearable device 1100 and the smartphone 900. For example, a plurality of temperature sensors and a thermal resistance structure are provided in a main body case of the ear-wearable device 1100 to measure temperature when the main body case is inserted into the ear, and the smartphone 900 may receive temperature data from the ear-wearable device 1100 and may estimate core body temperature and output an estimation result. Alternatively, the ear-wearable device 1100 may measure temperature and estimate body temperature, and the smartphone 900 may output temperature data and/or core body temperature data received from the ear-wearable deice 1100.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
a first circuit board;
a first temperature sensor disposed on the first circuit board and configured to measure a first temperature of body skin of a user;
a second circuit board spaced apart from the first circuit board;
a second temperature sensor disposed on the second circuit board and configured to measure a second temperature inside a main body of the electronic device;
a heat transfer material disposed between the first circuit board and the second circuit board, and in contact with the first circuit board and the second circuit board; and
at least one processor configured to obtain a skin heat flux based on the first temperature and the second temperature, and estimate a core body temperature of the user based on the first temperature and the skin heat flux.

2. The electronic device of claim 1, wherein at least one of the first temperature sensor and the second temperature sensor is a contact-type temperature sensor comprising a thermistor.

3. The electronic device of claim 1, wherein the first temperature sensor and the second temperature sensor are arranged in a thickness direction of the main body of the electronic device.

4. The electronic device of claim 1, wherein the thermal resistance structure has the thermal resistance that corresponds to a thermal resistance parameter including a thickness, a thermal conductivity, and a cross-sectional area of the thermal resistance structure.

5. The electronic device of claim 1, wherein the heat transfer materials-material comprise at least one of a C-clip and a pin connector.

6. The electronic device of claim 1, wherein the first circuit board, the second circuit board, and the heat transfer material constitute a thermal resistance structure,
wherein the heat transfer material comprises a first heat transfer material and a second heat transfer material,
wherein a thermal resistance parameter of the thermal resistance structure corresponds to types of the first circuit board and the second circuit board, types of the first heat transfer material and second heat transfer material, distances between the first heat transfer material and second heat transfer material, a distance between the first circuit board and the second circuit board, cross-sectional areas of the first circuit board and the second circuit board, and board contact areas of the first heat transfer material and second heat transfer material.

7. The electronic device of claim 6, wherein the thermal resistance parameter comprises the distances between the first heat transfer material and second heat transfer material and the distance between the first circuit board and the second circuit board, as a thickness parameter of the thermal resistance structure.

8. The electronic device of claim 6, wherein the thermal resistance parameter comprises a thermal conductivity of at least one of the first circuit board and the second circuit board, and thermal conductivities of first heat transfer material and second heat transfer material, as a thermal conductivity parameter of the thermal resistance structure.

9. The electronic device of claim 6, wherein the thermal resistance parameter comprises contact areas between the first heat transfer material and second heat transfer material and each of the first circuit board and the second circuit board, and a cross-sectional area of at least one of the first circuit board and the second circuit board, as a cross-section area parameter of the thermal resistance structure.

10. The electronic device of claim 1, wherein the at least one processor is further configured to estimate the skin heat flux based on the difference between the first temperature and the second temperature.

11. The electronic device of claim 1, further comprising a heat flux sensor disposed in the main body and configured to estimate a first heat flux,
wherein the at least one processor is further configured to estimate a second heat flux based on the difference between the first temperature and the second temperature, and obtain the skin heat flux based on the first heat flux and the second heat flux.

12. The electronic device of claim 1, wherein the at least one processor is further configured to estimate the core body temperature based on the first temperature and the skin heat flux by using a predefined body temperature estimation model.

13. The electronic device of claim 1, further comprising a display configured to output at least one of the first temperature, the second temperature, the core body temperature, core body temperature change information during a predetermined period, and body temperature guidance information.

14. A method of estimating a core body temperature in an electronic device, the method comprising:
by a first temperature sensor, measuring a first temperature of body skin of a user;
by a second temperature sensor, measuring a second temperature inside a main body of the electronic device, the main body comprising a first circuit board on which the first temperature sensor is disposed, a second circuit board which is spaced apart from the first circuit board, and on which the second temperature sensor is disposed, and a heat transfer material disposed between the first circuit board and the second circuit board and in contact with the first circuit board and the second circuit board;
obtaining a skin heat flux based on the first temperature and the second temperature; and
estimating the core body temperature of the user based on the first temperature and the skin heat flux.

15. The method of claim 14, wherein the first circuit board, the second circuit board, and the heat transfer material constitute a thermal resistance structure, and
wherein the thermal resistance structure has the thermal resistance that corresponds to a thermal resistance parameter of the thermal resistance structure including a thickness, a thermal conductivity, and a cross-sectional area of the thermal resistance structure.

16. The method of claim 14, wherein the obtaining of the skin heat flux comprises estimating the skin heat flux based on the difference between the first temperature and the second temperature.

17. The method of claim 14, wherein the obtaining of the skin heat flux comprises:
by a heat flux sensor, measuring a first heat flux;
estimating a second heat flux based on the difference between the first temperature and the second temperature; and
obtaining the skin heat flux based on the first heat flux and the second heat flux.

18. A wearable device comprising:
a main body comprising:
a body contact surface;
a first circuit board and a second circuit board that are apart from each other;
a plurality of temperature sensors comprising a first temperature sensor disposed on the first circuit board and configured to measure a first temperature of body skin of a user, and a second temperature sensor disposed on the second circuit board and configured to measure a second temperature inside the main body, when the body skin of the user comes into contact with the body contact surface;
a heat transfer material disposed between the first circuit board and the second circuit board, and in contact with the first circuit board and the second circuit board; and
at least one processor configured to perform predetermined operations based on temperature data measured by the plurality of temperature sensors.

19. The wearable device of claim 18, wherein the predetermined operations comprise at least one of transmitting the temperature data to another electronic device, determining a measurement state based on the temperature data, estimating core body temperature based on the temperature data, generating guidance information based on the temperature data, and outputting a processing result.

* * * * *